US011651119B2

(12) United States Patent
Karri et al.

(10) Patent No.: US 11,651,119 B2
(45) Date of Patent: May 16, 2023

(54) DETECTION OF DEFECTS WITHIN PHYSICAL INFRASTRUCTURE BY LEVERAGING AI

(71) Applicant: International Business Machines Corporation, Armonk, NY (US)

(72) Inventors: Venkata Vara Prasad Karri, Visakhapatnam (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 17/029,306

(22) Filed: Sep. 23, 2020

(65) Prior Publication Data

US 2022/0092234 A1 Mar. 24, 2022

(51) Int. Cl.
*G06F 30/20* (2020.01)
*G06N 5/02* (2023.01)
(Continued)

(52) U.S. Cl.
CPC .............. *G06F 30/20* (2020.01); *G06F 30/18* (2020.01); *G06N 5/02* (2013.01); *G06F 30/25* (2020.01);
(Continued)

(58) Field of Classification Search
CPC .......... G06F 30/20; G06F 30/18; G06F 30/25; G06F 30/27; G06F 30/28; G06F 2111/00; G06F 2119/22; G06N 5/02
See application file for complete search history.

(56) References Cited

U.S. PATENT DOCUMENTS

| 2005/0177353 A1* | 8/2005 | Slater ..................... G06F 30/20 |
| | | 703/6 |
| 2008/0036487 A1* | 2/2008 | Bradley ........... G01R 31/31708 |
| | | 324/762.02 |

(Continued)

FOREIGN PATENT DOCUMENTS

| WO | 2009018971 A1 | 2/2009 |
| WO | 2013143002 A1 | 10/2013 |

OTHER PUBLICATIONS

Bhowmik, Subrata, "Digital Twin of Subsea Pipelines: Conceptual Design Integrating IoT, Machine Learning and Data Analytics", OTC-29455-MS, Offshore Technology Conference, May 6-9, 2019, 9 pages, Houston, Texas USA, <https://sci-hub.tw/https://doi.org/10.4043/29455-MS>.

(Continued)

*Primary Examiner* — Kibrom K Gebresilassie
(74) *Attorney, Agent, or Firm* — Monchai Chuaychoo (57) ABSTRACT

An approach for maintaining pipeline infrastructure based on graphical images is disclosed. The approach receives a plurality of parameters in a pipeline infrastructure by using a plurality of sensors. The approach generates a digital twin of the determined one or more susceptible and/or vulnerable points/areas/joints in the pipeline infrastructure. The approach simulates the determined susceptible areas/points/joints in the pipeline infrastructure for determining one or more damages and/or defects. The approach predicts one or more proactive maintenance actions based on the determined damage and/or defect in the pipeline infrastructure to prevent the users from being near the susceptible area/joints/portions and prioritizing the proactive maintenance actions based on the level and extent of damage and/or defect.

20 Claims, 4 Drawing Sheets

(51) Int. Cl.
*G06F 30/18* (2020.01)
*G06F 30/28* (2020.01)
*G06F 30/25* (2020.01)
*G06F 30/27* (2020.01)
*G06F 119/22* (2020.01)
*G06F 111/00* (2020.01)

(52) U.S. Cl.
CPC .............. *G06F 30/27* (2020.01); *G06F 30/28* (2020.01); *G06F 2111/00* (2020.01); *G06F 2119/22* (2020.01)

(56) References Cited

U.S. PATENT DOCUMENTS

| | | | |
|---|---|---|---|
| 2013/0197833 A1 | 8/2013 | Israeli | |
| 2016/0292652 A1* | 10/2016 | Bowden, Jr. | ........... G06Q 10/20 |
| 2017/0076563 A1* | 3/2017 | Guerriero | ................. F17D 5/06 |
| 2017/0328522 A1 | 11/2017 | Battaglini | |
| 2017/0329307 A1* | 11/2017 | Castillo-Effen | .......... B25J 9/163 |
| 2018/0275100 A1* | 9/2018 | Sutherland | ........... G05D 7/0676 |
| 2018/0329433 A1* | 11/2018 | Zhao | .................... G05D 1/0094 |
| 2018/0365555 A1* | 12/2018 | Aslam | .................. G06N 3/0436 |
| 2019/0339210 A1* | 11/2019 | Stewart | ................... G06T 11/00 |

OTHER PUBLICATIONS

Brattoli et al., "Odour Detection Methods: Olfactometry and Chemical Sensors", Sensors 2011, 11, 5290-5322; doi:10.3390/s110505290, Published May 16, 2011, 33 pages, <https://www.ncbi.nlm.nih.gov/pmc/articles/PMC3231359/>.

Rosen et al., "About The Importance of Autonomy and Digital Twins for the Future of Manufacturing", International Federation of Automatic Control, IFAC-PapersOnLine 48-3 (2015) pp. 567-572, <https://www.sciencedirect.com/science/article/pii/S2405896315003808>.

Sisinni et al., "Industrial Internet of Things: Challenges, Opportunities, and Directions", IEEE Transactions on Industrial Informatics, Nov. 2018, 11 pages, vol. 14, No. 11, <https://ieeexplore.ieee.org/document/8401919>.

\* cited by examiner

DETECTION OF DEFECTS WITHIN PHYSICAL INFRASTRUCTURE BY LEVERAGING AI

BACKGROUND

The present invention relates generally to detecting defect/issues within piping infrastructure, and more particularly to detecting potential hazardous materials released into surrounding associated with the defect.

In large industrial plants, there are multiple chemical compositions that are used across the plant to perform a certain function (e.g., refining petroleum gas into liquid, etc.). Other applications of these chemical compositions include manufacturing where raw materials are extracted, processed and refined into different products. By-products and/or material wasted can accumulate from the industrial plants and manufacturing process in various forms. This industrial waste can be hazardous to the health of humans and the environment if not properly contained and detected.

SUMMARY

Aspects of the present invention disclose a computer-implemented method, a computer system and computer program product for maintaining pipeline infrastructure. The computer implemented method may be implemented by one or more computer processors and may include: receiving data associated with the pipeline infrastructure; generating a digital twin of the pipeline infrastructure based on the received data; generating defect data based on simulating one or more defect scenarios associated with the digital twin; analyzing the defect data; creating an action plan based on analysis; and outputting the action plan.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Digital twin computing leverages IoT, artificial intelligence (i.e., leveraging machine/deep learning) and software analytics to create living digital simulation models that update and change as their physical counterparts change. A digital twin continuously learns and updates itself to represent its near real-time status. A digital twin also integrates historical data from past usage to factor into its digital model. What is a simulation? A simulation is an approximation of a process and/or a system (e.g., machines, etc.). Furthermore, simulations are run in virtual environments that may be representations of physical environments but do not integrate real-time data (i.e., used by digital twin computing). The main difference between a simulation (and/or modeling) versus a digital twin is that a digital twin can use real-time data based on the regular transfer of information between the digital twin and its corresponding physical environment.

Embodiments of the present invention provides an approach for predicting failures related to pipeline infrastructure (e.g., gathering pipelines, transportation pipelines and distribution pipelines, etc.) by leveraging digital twin computing. A pipeline infrastructure can comprise of, but it is not limited to, a) subsea pipeline/fluid distribution network carrying oil, gas, water, etc., b) drainage and sewage piping for residential and/or commercial network, c) industrial pipeline distribution carrying raw materials (e.g., ammonia, alcohol, coal and ore, hydrogen, etc.), d) pipeline in a medical environment (e.g., oxygen, carbon dioxide, nitrous oxide, etc.), e) pipeline associated with food consumption (e.g., beer, brine, milk, etc.) and f) pipeline for heating (i.e., carrying pressurized hot water).

Furthermore, embodiment can be used on any asset (e.g., industrial plan, hospital, residence, etc.) to identify which portion of the pipeline or valve that will can fail and emit waste/hazardous materials. The approach utilizes, but it is not limited to, the following factors: i) historical learning of maintenance records related to the pipeline infrastructure and ii) predicted susceptible joints in the pipeline infrastructure laid based on the expiry date of the material used, iii) the amount of pressure the pipe can withstand, iv) the type of fluid carried by the pipe and v) internal and external environment conditions (i.e., if it rains then the waste effluents will generate more smell, etc.). By creating a digital twin of various scenarios and environments (e.g., hospital, hotels, chemical manufacturing plant, office complexes), along with the use of IoT devices (e.g., cameras, chemical and olfactory, etc.), the embodiment can identify and/or predict, through augmented intelligence, failures/defects of pipe carrying chemicals that can be hazardous to humans and the environment. Based on using the real-time data and historical data, the approach can alert humans in real time and proactively act. For example, a digital twin was created for an industrial complex, plant_A. The complex includes multiple drainage system (e.g., pipe_A, pipe_B, etc.) exiting into the environment. Using the approach, the digital twin computing system will simulate the drainage and sewage piping system of plant_A and predict and/or discover, i) current defect(s) and/or ii) future defect(s) based on MTTF (Mean time to failure) of the materials of the piping system. The approach has recognized that pipe_A, a section of the drainpipe, has a small leak (hazardous material) and immediately relays the information to a team to fix the issue. Additionally, the approach can predict a future failure (of a joint) based on the materials used and can send a team to perform preventative maintenance on the critical joint of a natural gas pipeline (which could be catastrophic if failed).

In another embodiment, the approach can detect leak/defect associated with spots/location/valves/junctions/joints in a subsea pipeline/fluid distribution network/pipeline by leveraging digital twin representation (e.g., simulation, real-time, etc.) of the actual subsea pipeline/fluid distribution network (i.e., carrying oil, gas, water or etc.), wherein the pipeline distribution is part of an asset and/or resources of an organization. For example, large companies may choose to manage their assets/resources with an integrated workplace management system (IWMS) and/or an AI (artificial intelligence) driven APM (Asset Performance Management) system. The embodiment can interface with IWMS and/or APM system. However, the approach can function separately as well. The approach can simulate the digital twin representation of the subsea pipeline under a plurality of conditions and parameters for determining a defect (i.e., potential leakage, slugging, high pressure and sudden change in pipe behavior) in the subsea pipeline. The approach can simulate the determined susceptible areas/points/joints in the pipeline infrastructure for determining one or more damages/defects, level/extent of damage/defect and duration of damage/defect in the pipeline infrastructure using the generated digital twin model.

Other embodiment, the approach can predict potential defect and take a proactive action by starting a preventive maintenance/repair operation to prevent the pipeline from the potential leak defect and prioritizing the maintenance/repair operation based on the leakage flow rate in the pipeline. For example, using historical and real time-data, embodiment can take action in real-time to warn humans in close-proximity to the soon-to-be defective pipeline.

Other embodiments of the present invention may recognize one or more of the following facts, potential problems, potential scenarios, and/or potential areas for improvement with respect to the current state of the art: i) generating a digital twin of the determined one or more susceptible/vulnerable points/areas/joints in the pipeline infrastructure, ii) simulating the determined susceptible areas/points/joints in the pipeline infrastructure for determining one or more damages/defects, level/extent of damage/defect and duration of damage/defect in the pipeline infrastructure using the generated digital twin, iii) setting a human threshold limit of the allergic smell factor based on the profile of the people in the proximity of the affected area and alerting people from reaching the affected area measured with smell sensors and guide specially abled people with voice enabled commands based on the floor plan and sensor placements, iv) identifying the two or more gases that can mix and form dangerous combination due to increased toxicity or reactive nature, v) identification of dynamic safe zones with equipped gas masks and other tools for humans in the surrounding affected area based on the gas/liquid leak avoiding the gas/liquid from their contact, vi) leveraging the digital twin to have the capability to identify the new category of smell and place an order in real-time, vii) a feedback system to understand if a smell is not detected by the current system and notify the sensor manufacturing unit/industry to design new sensors for the category of gas identified and viii) the simulation engine will be to identify which access point are highly vulnerable to weather changes and which points might interact with other points and suggest changes in a dynamic way to respective teams and/or alerting the vendor system to define action plans.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

Figure 1:
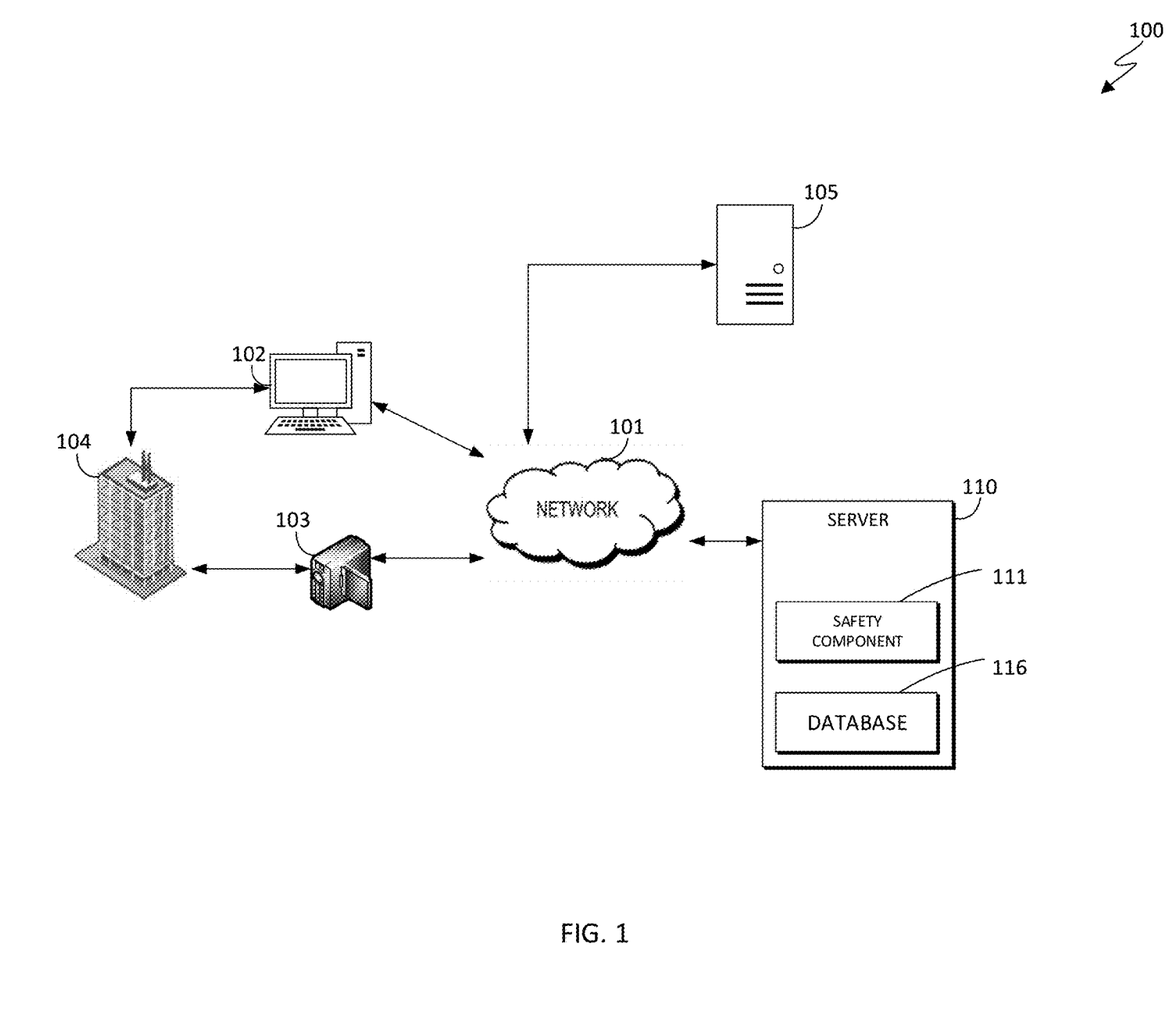
FIG. 1 is a functional block diagram illustrating a high level overview of the safety detection environment, designated as 100, in accordance with an embodiment of the present invention.

FIG. 1 is a functional block diagram illustrating a safety detection environment 100 in accordance with an embodiment of the present invention. FIG. 1 provides only an illustration of one implementation and does not imply any limitations with regards to the environments in which different embodiments may be implemented. Many modifications to the depicted environment may be made by those skilled in the art without departing from the scope of the invention as recited by the claims.

Proposed system will have the smart sensors and cameras (i.e., sensors 103) at the appropriate places (i.e., building 104) in the industry (chemical plant, hospitals, Offices etc.,) covering the most susceptible points based on historical readings obtained from installations and based on the data from Computer Aided Design (CAD) software.

Safety detection environment 100 includes network 101, computing device 102, sensors 103 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, computing device 102 and other computing devices (not shown) within safety detection environment 100. It is noted that other computing devices can include, but is not limited to, computing device 102 and any electromechanical devices capable of carrying out a series of computing instructions.

Computing device 102 can be a computing device with the capability of interfacing with sensors 103 and other servers. Computing device 102 can be an artificial intelligent integrated workplace management system (IWMS). IWMS (i.e., IBM TRIRIGA®) is a software platform that helps organizations optimize the use of workplace resources, including the management of a company's real estate portfolio, infrastructure and facilities assets. IWMS solutions are commonly packaged as a fully integrated suite or as individual modules that can be scaled over time. They are used by corporate occupiers, real estate services firms, facilities services providers, landlords and managing agents. Computing device 102 can be an AI driven APM (Asset Performance Management) system. APM system are used to improve the reliability and availability of physical assets while minimizing risk and operating costs. APM, such as, IBM Maximo®, typically includes condition monitoring, predictive maintenance, asset integrity management, reliability-centered maintenance, and often involves technologies such as asset health data collection, visualization, and analytics. APM can be used in conjunction with EAM (enterprise assessment management) system for a complete and holistic management of business objective.

Sensors 103 can be any device used for detecting objects, chemical compounds/elements, auditory signals, electromagnetic signal and images. Sensors 103 can include IoT devices, such as, cameras, olfactory and chemical detectors. Sensors 103 can gather the water/liquid/gas quality information passing through the pipes.

Building 104 can be any building (e.g., industrial plant, piping infrastructure, residence, etc.) being analyzed by the embodiment.

Digital twin server 105 can be servers used to simulate the digital twin of building 104. Digital twin server can communicate with sensors 103 to update the simulation status. Furthermore, digital twin server 105 can communicate with computing devices 102 in order to leverage artificial intelligence capabilities of the IWMS and APM platforms.

Server 110, digital twin server 105 and computing device 102 can be a standalone computing device, a management server, a web server, a mobile computing device, or any other electronic device or computing system capable of receiving, sending, and processing data. In other embodiments, server 110, digital twin server 105 and computing device 102 can represent a server computing system utilizing multiple computers as a server system, such as in a cloud computing environment. In another embodiment, server 110, digital twin server 105 and computing device 102 can be a laptop computer, a tablet computer, a netbook computer, a personal computer (PC), a desktop computer, a personal digital assistant (PDA), a smart phone, or any other programmable electronic device capable of communicating other computing devices (not shown) within safety detection environment 100 via network 101. In another embodiment, server 110, digital twin server 105 and computing device 102 represents a computing system utilizing clustered computers and components (e.g., database server computers, application server computers, etc.) that act as a single pool of seamless resources when accessed within safety detection environment 100.

Embodiment of the present invention can reside on server 110. Server 110 includes safety detection component 111 and database 116.

Safety detection component 111 provides the capability of gathering historical and/or real-time data from sensors 103 (and other sources such as social media and crowd source) associated with the piping infrastructure of a building (e.g., industry plant, hospital, house, etc.), running a simulation using twin digital computing and predicting failures associated with the pipe that's carrying potential hazardous materials.

Database 116 is a repository for data used by safety detection component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within safety detection environment 100, provided that safety detection component 111 has access to database 116. Database 116 may store information associated with, but is not limited to, knowledge corpus, i) MTTF of the materials associated pipeline infrastructure, ii) a human threshold limit of the allergic smell factor, iii) profile of the people in the proximity of the affected area iv) understanding of how two or more gases that can mix and form dangerous combination due to increased toxicity or reactive nature, v) new category of smell, vii) access point are highly vulnerable to weather changes and which points might interact with other points within a pipeline infrastructure, viii) types and/or materials used by the pipeline infrastructure, ix) materials being carried by the pipeline infrastructure and x) diagram/pipeline CAD (computer aided design) rendering of the entire pipeline infrastructure.

Figure 2:
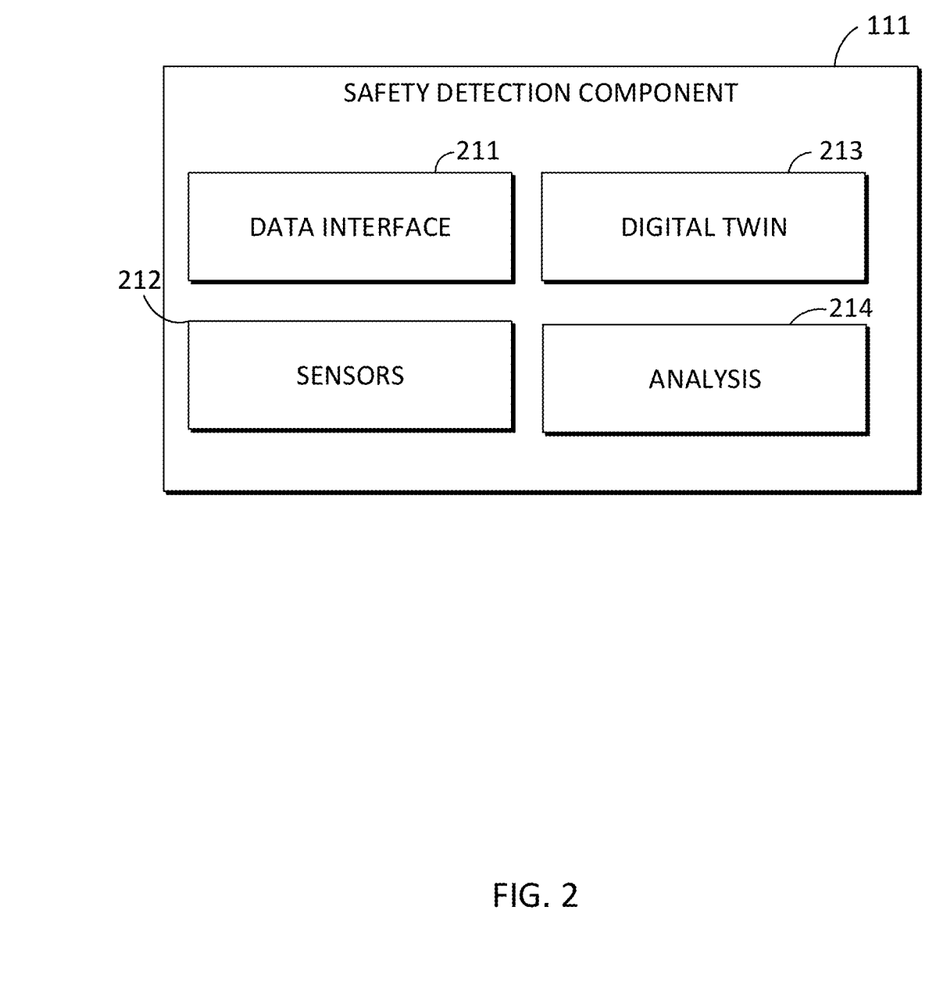
FIG. 2 is a functional block diagram illustrating the subcomponents of safety detection component 111, in accordance with an embodiment of the present invention.

FIG. 2 is a functional block diagram illustrating safety detection component 111 in accordance with an embodiment of the present invention. In the depicted embodiment, safety detection component 111 includes data interface component 211, sensors component 212, digital twin component 213 and analysis component 214.

As is further described herein below, data interface component 211 of the present invention provides the capability of communicating with data servers (i.e., computing device 102) to obtain relevant information associated with a particular building/plant. The relevant information can include, but it is not limited to, building size, specifications related to all piping used throughout the building, date of install, date of inspection, type of chemical matter being transported/contained by the pipes. It is further noted that data provided by the IWMS and/or APM system could be used to feed into digital twin component 213 and/or directly to digital twin server 105.

As is further described herein below, sensors component 212 of the present invention provides the capability of communicating with sensors (i.e., sensors 103) to obtain real-time and/or historical information associated with various sensors (e.g., smell, flow rate, camera, etc.) attached to the building/plant including piping infrastructure. The information from sensor component 212 can further be communicated to digital twin server 105 and/or digital twin component 213.

As is further described herein below, digital twin component 213 of the present invention provides the capability of communicating with digital twin server 105. Digital twin component 314, can run simulations, with AI, of various scenarios on digital twin server 105. Scenarios can include, but it is not limited to, i) simulate the drainage and sewage piping system of any asset to identify which portion of the pipeline or valve can emit waste effluents and get toxic and health threatening substances which could mix with other pipelines, ii) simulating which portion of the piping system will have toxic gases or drainage water that can produce foul smell (i.e., the contamination might interact with good gases or good liquid and diversion or replacements identified), iii) predicting the foul smell that can turn into sewer gases and cause based on their interactions with external and internal liquids/gases, iv) analyze the building structure, various access points of drainage system, gases ejection modules, vents, T-Section and accordingly using historical learning and identifying which access point are highly vulnerable to weather changes and which points might interact with other points, v) predicting scaling, rusting, etc., in the pipeline infrastructure and vi) analyze and predict which joints/coupling within a pipeline infrastructure could failed due to age of pipeline material used and/or changes to materials being carried.

Furthermore digital twin component 213 can, through sensors component 212, i) tracking the water/gas flow rate, pressure, temperature, content, etc., of each of the pipes, the material, diameter etc. and ii) track information related to the alignment of the piping system, different bends, and flow rate.

Other embodiment of digital twin component 213 can include, leveraging AI to learn the historically gathered data (including a knowledge corpus from database 116) related to the water/liquid/gas transmission, through pipes, and accordingly be correlating the types of problem: (i) piping parameters—joints, junctions, areas where there is relatively more liquid flow, etc., (ii) type of liquid, (iii) quantity of liquid flow, (iv) pressure changes, (v) temperature anomalies etc. For example, gases emanating from sewage pipes in buildings, such as, malls, hospitals, airports, offices and similar building away from the industrial sectors.

As is further described herein below, analysis component 214 of the present invention provides the capability of analyzing data (i.e., defect data) from digital twin component 213 based on the simulation runs. Defect data can include, but it is not limited to, i) identified damages in the water pipes, ii) defect in the valves based on the types of material etc., iii) identified which portion of the physical pipes can have scaling or rusting, or changes of breaking etc. and, iv) identified the possible timeline when the pipes could face potential problem and needs replacement/repair.

Based on the analysis, analysis component 214 can make recommendations and/or take actions based on the results of the analysis. For example, analysis component 214 can generate the following (i.e., action plan), i) suggestions for dynamic replacement or repair of susceptible areas, ii) suggest changes in a dynamic way to respective teams and/or alerting the vendor system (e.g., APM, IWMS) to define action plans, iii) prioritizing the need of replacement, recommending the appropriate quality of valve, pipe etc., the proposed system will be creating proactive maintenance plan, iv) identify which portion of the storage, and piping system needs cleaning to avoid any contamination based on historical data, IoT feed analysis, v) suggests the installation of smell sensors at locations which are susceptible for leakage of liquid/gas based on historical and predicted data, vi) validates for people in the location and the people are notified through contextual IoT devices (e.g., wearable device, smartphone, laptops etc.,), vii) alerting the people to move to the appropriate safe zone to avoid further infliction based on the severity of the gas/liquid identified the system (i.e., move to a safe zone) and viii) the affected pipe is identified and relayed to the nearest maintenance unit and based on the component affected will also notify the vendor management system. For example (referring to list, "vi"), if any worker on shop floor is wearing a wearable smartwatch or carrying a smart phone, then the worker can be alerted by the sensors/office alerting systems when leakages happen (or could happen).

Furthermore, analysis component 214 can take certain actions based on scenarios. For example, if there is a gas leak (could be a foul smell near to the restroom, or a hazardous gas leak in an industry) based on the sensors then if the leaking gas exceed a predefined threshold, then it transmits the data to the system. And analysis component 214 can send alerts if there are humans within the vicinity of the gas leak. It is noted that human smell threshold are set at crucial spots based on the people's allergic capacity and places of susceptibility and human smell threshold may have different tolerance than a device smell (i.e., chemical detector) threshold. Thus, system has options of setting the threshold to either, i) human smell or ii) device smell based on the situation (i.e., gas being carried).

In another embodiment, analysis component 214 can carry out an action plan by sending out one or more robotic drones to perform the tasks outlined by the action plan. For example, joint #55 of pipe_A sits in 1600 meters of water, too deep for a human diver to weld. Thus, a robotic drone is automatically selected by the embodiment to perform the welding work.

In other embodiment, analysis component 214 can send data from digital twin component 213 for analysis. The analysis performed from service centers/vendor will be done in a periodic basis to identify the types of problem and the reason of problem with water pipe etc. For example, analysis component 214 can sync defect data from identified damages to the pipes to the APM system every 6 hours and based on the criticality of operation of the pipe system.

Figure 3:
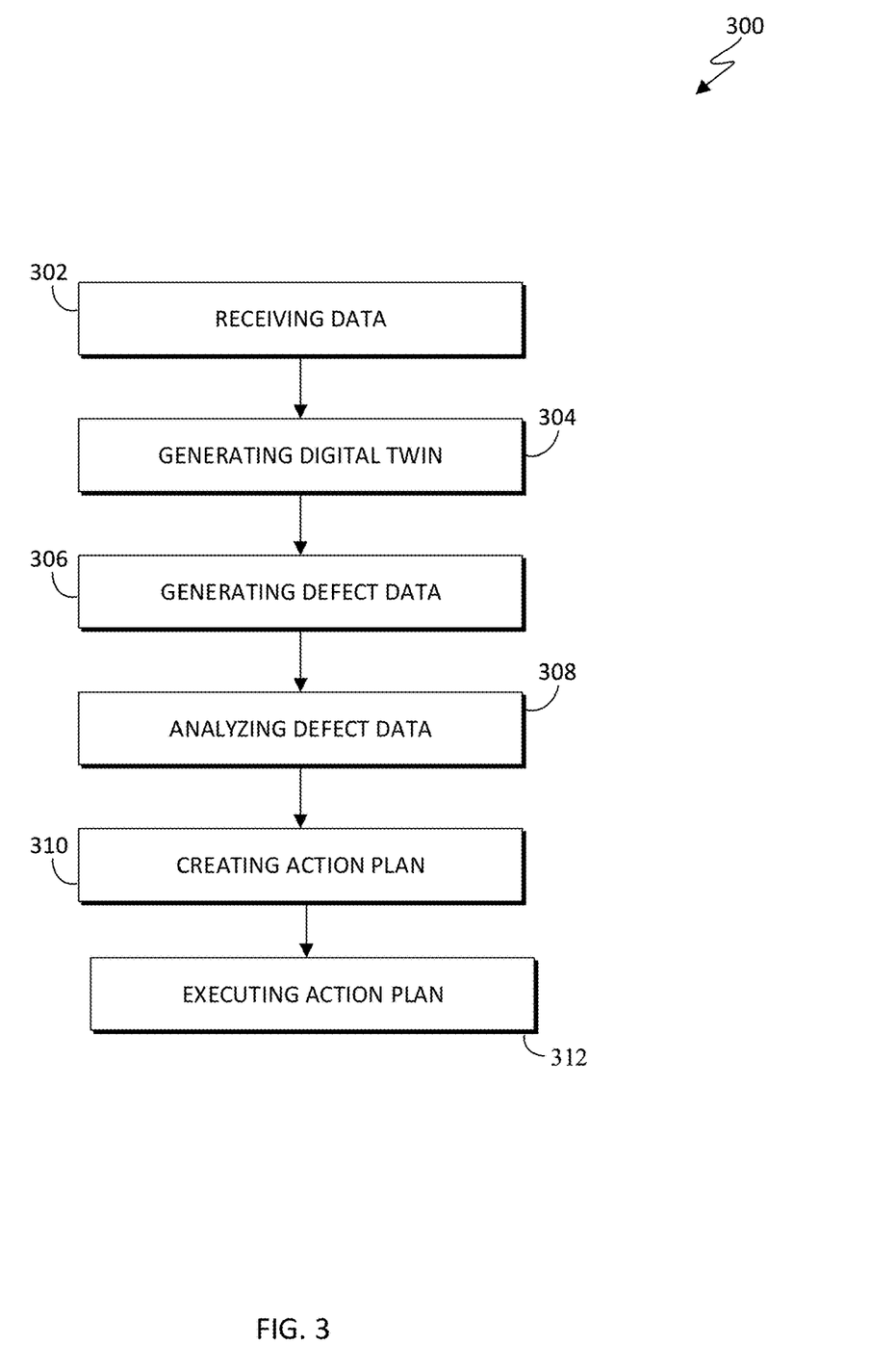
FIG. 3 is a high-level flowchart illustrating the operation of safety detection component 111, designated as 300, in accordance with an embodiment of the present invention.

FIG. 3 is a flowchart illustrating the operation of safety detection component 111, designated as 300, in accordance with another embodiment of the present invention.

Safety detection component 111 receives data (step 302). In an embodiment, safety detection component 111, receives data from data interface component 211 associated with the target infrastructure. For example, an oil exploration/drilling rig, rig_A, located off 66 kilometers offshore sits over 1600 meters above over an oil well. Rig_A has an expansive network of oil pipelines connected from it and to the inland shore pumping station, station_A. Operator of rig_A, would like to create a digital twin copy of the entire pipeline infrastructure from rig_A to station_A. User request and receives various data (e.g., schematic, materials, etc.) from various database, computing device 102 and including IoT devices (i.e., sensors 103) relating to rig_A, station_A and pipelines between rig_A and station_A.

Safety detection component 111 generates digital twin (step 304). In an embodiment, safety detection component 111, through digital twin component 213, creates digital twin copy of the target infrastructure (i.e., building 104). For example, data from sensors 103 and/or from IWMS/APM system is used by digital twin server 105 to create an exact digital replica of rig_A, station_A and all piping between the two facilities.

Safety detection component 111 generate defect data (step 306). In an embodiment, safety detection component 111, through digital twin component 213, initiate several FMEA (failure modes and effect analysis) simulations and scenarios on the digital twin copy. For example, pipeline between rig_A and station_A is scrutinized during the FMEA analysis to determine of any potential cracks between piping joints based on the current gas flow (and future gas flow). A defect data is generated based on the analysis.

Safety detection component 111 analyze defect data (step 308). In an embodiment, safety detection component 111, through analysis component 214, analyzes the defect data generated by the scenarios. For example, a defect data indicates a potential crack may develop on joint #55 of pipe_A due to the materials used and poor weld joins. It is possible that there are no defect data due to, i) inadequate/insufficient data or 2) the infrastructure is robust enough to withstand any FMEA analysis during the timeframe the simulation was ran. It is further possible that all materials were recently replaced (2 months ago prior to the FMEA analysis) and therefore, all piping are robust enough to withstand any potential incident and/or accident.

Safety detection component 111 create action plan (step 310). In an embodiment, safety detection component 111, through analysis component 214, creates an action plan base d on the analyzed defect data. For example, the defect data includes a potential issue with joint #55 of pipe_A, an action plan is created to further strengthen the joint by welding more materials that can withstand more pressure. In another example, (similar oil rig), there is a crack identified in an external pipe joint (not underwater) and harmful gases are emanating close to human contacts, the sensors identify the gases as possibly poisonous and suggests for micro-robots to repair the system safely.

It is noted that the action plan can be created by safety detection component 111 or created by IWMS and/or APM system.

Safety detection component 111 execute action plan (step 312). In an embodiment, safety detection component 111, through analysis component 214 and/or sensors component 212 may execute the action plan by sending out robotic drones to perform the tasks outlined by the action plan. For example, joint #55 of pipe_A sits in 1600 meters of water, too deep for a human diver to weld. Thus, a robotic drone is automatically selected by the embodiment to perform the welding work.

Figure 4:
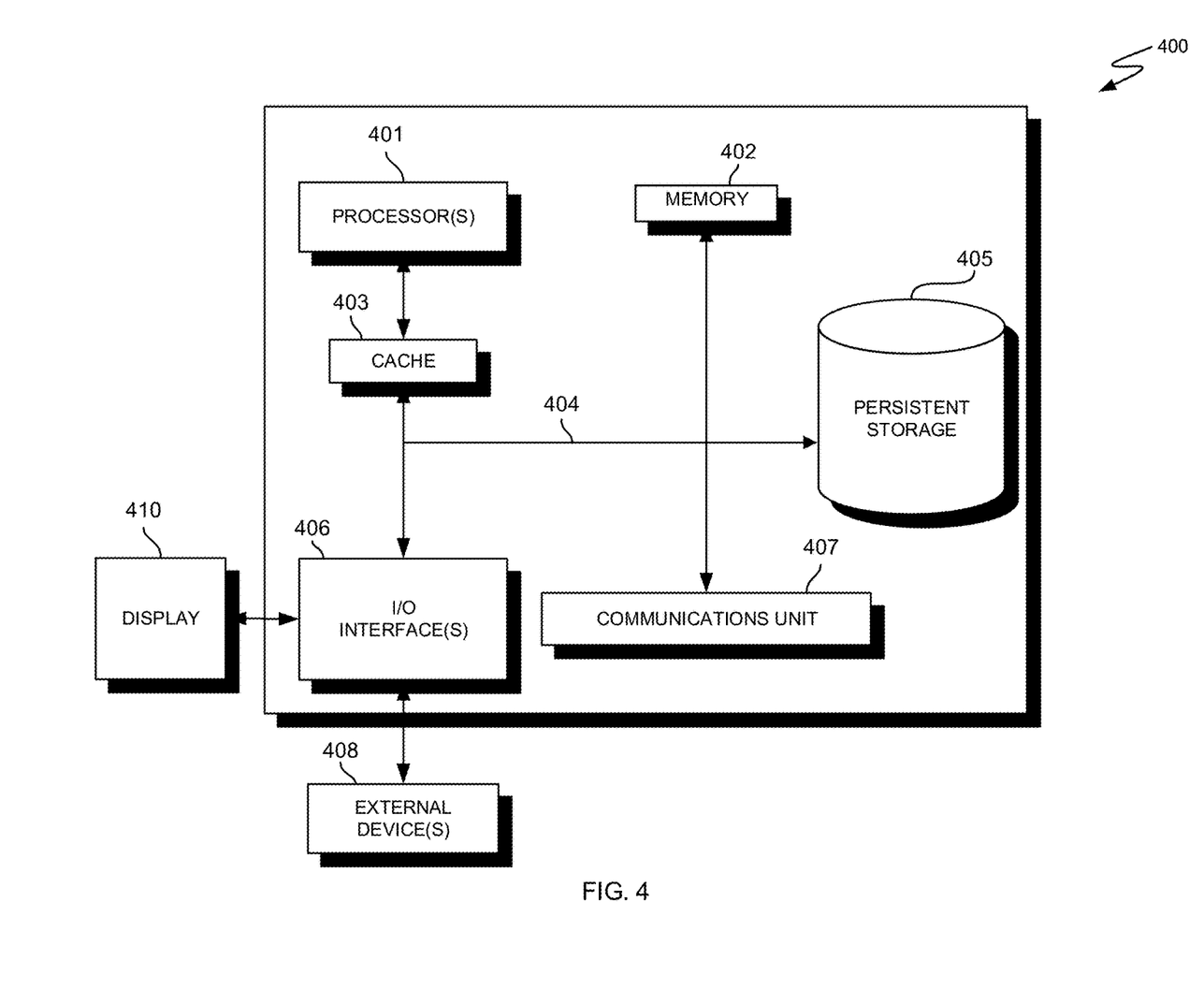
FIG. 4 depicts a block diagram, designated as 400, of components of a server computer capable of executing the safety detection component 111 within the safety detection environment 100, in accordance with an embodiment of the present invention.

FIG. 4, designated as 400, depicts a block diagram of components of safety detection component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Safety detection component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Safety detection component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Safety detection component 111) used to practice embodiments of the present invention can be stored on such portable computer readable storage media and can be loaded onto persistent storage 405 via I/O interface(s) 406. I/O interface(s) 406 also connect to display 410.

Display 410 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. I t will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for maintaining a pipeline infrastructure, the computer-implemented method comprising:
    receiving data associated with the pipeline infrastructure, wherein the received data further comprises of a MTTF (mean time to failure) of materials associated pipeline infrastructure, types and materials used by the pipeline infrastructure and weather pattern;
    generating a digital twin of the pipeline infrastructure based on the received data;
    generating defect data based on simulating one or more defect scenarios associated with the digital twin;
    analyzing the defect data;
    creating an action plan based on analysis; and
    outputting the action plan.

2. The computer-implemented method of claim 1, wherein the pipeline infrastructure further consisting of, a subsea distribution pipeline, a drainage and sewage piping, an industrial pipeline distribution carrying raw materials, a pipeline in a medical environment, a pipeline for heating and a pipeline associated with food consumption.

3. The computer-implemented method of claim 1, wherein the received data further consisting of, the materials being carried by the pipeline infrastructure and diagram/pipeline CAD (computer aided design) rendering of the entire pipeline infrastructure.

4. The computer-implemented method of claim 1, wherein the one or more defect scenarios further consisting of simulate drainage and sewage piping system of any asset to identify which portion of the pipeline or valve can emit waste effluents and get toxic and health threatening substances which could mix with other pipelines, simulate which portion of piping system will have toxic gases or drainage water that can produce foul smell and predicting foul smell that can turn into sewer gases, analyze an asset and identify which access point are highly vulnerable to weather changes and which points might interact with other points, predicting scaling/rusting in the pipeline infrastructure and analyze and predict which joints/coupling within the pipeline infrastructure could failed due to age of pipeline material used and/or changes to the materials being carried.

5. The computer-implemented method of claim 1, wherein the defect data further consisting of, identified damages in water pipes, defect in valves based on the types of material, identified which portion of physical pipes that can have scaling or rusting and identified the possible timeline when the physical pipes could face potential problem and needs replacement.

6. The computer-implemented method of claim 1, wherein the action plan further consisting of, suggestions for replacement or repair of susceptible areas, create a proactive maintenance plan, identify which portion of storage and piping system needs cleaning, suggests the installation of smell sensors at locations which are susceptible for leakage, alerting the people to move to safe zone and notify the vendor management system.

7. The computer-implemented method of claim 1, wherein outputting the action plan further comprises:
   sending one or more robotic drones to perform tasks outlined by the action plan.

8. A computer program product for maintaining pipeline infrastructure, the computer program product comprising:
   one or more non-transitory computer readable storage media and program instructions stored on the one or more computer readable storage media, the program instructions comprising:
      program instructions to receive data associated with the pipeline infrastructure, wherein the received data further comprises of a MTTF (mean time to failure) of materials associated pipeline infrastructure, types and materials used by the pipeline infrastructure and weather pattern;
      program instructions to generate a digital twin of the pipeline infrastructure based on the received data;
      program instructions to generate defect data based on simulating one or more defect scenarios associated with the digital twin;
      program instructions to analyze the defect data;
      program instructions to create an action plan based on analysis; and
      program instructions to output the action plan.

9. The computer program product of claim 8, wherein the pipeline infrastructure further consisting of, a subsea distribution pipeline, a drainage and sewage piping, an industrial pipeline distribution carrying raw materials, a pipeline in a medical environment, a pipeline for heating and a pipeline associated with food consumption.

10. The computer program product of claim 8, wherein the received data further consisting of, the materials being carried by the pipeline infrastructure and diagram/pipeline CAD (computer aided design) rendering of the entire pipeline infrastructure.

11. The computer program product of claim 8, wherein the one or more defect scenarios further consisting of, simulate drainage and sewage piping system of any asset to identify which portion of the pipeline or valve can emit waste effluents and get toxic and health threatening substances which could mix with other pipelines, simulate which portion of piping system will have toxic gases or drainage water that can produce foul smell and predicting foul smell that can turn into sewer gases, analyze an asset and identify which access point are highly vulnerable to weather changes and which points might interact with other points, predicting scaling/rusting in the pipeline infrastructure and analyze and predict which joints/coupling within the pipeline infrastructure could failed due to age of pipeline material used and/or changes to the materials being carried.

12. The computer program product of claim 8, wherein the defect data further consisting of, identified damages in water pipes, defect in valves based on the types of material, identified which portion of physical pipes that can have scaling or rusting and identified the possible timeline when the physical pipes could face potential problem and needs replacement.

13. The computer program product of claim 8, wherein the action plan further consisting of suggestions for replacement or repair of susceptible areas, create a proactive maintenance plan, identify which portion of storage and piping system needs cleaning, suggests the installation of smell sensors at locations which are susceptible for leakage, alerting the people to move to safe zone and notify the vendor management system.

14. The computer program product of claim 8, wherein outputting the action plan further comprises:
   sending one or more robotic drones to perform tasks outlined by the action plan.

15. A computer system for maintaining pipeline infrastructure, the computer system comprising:
   one or more computer processors;
   one or more non-transitory computer readable storage media; and
   program instructions stored on the one or more computer readable storage media for execution by at least one of the one or more computer processors, the program instructions comprising:
      program instructions to receive data associated with the pipeline infrastructure, wherein the received data further comprises of a MTTF (mean time to failure) of materials associated pipeline infrastructure, types and materials used by the pipeline infrastructure and weather pattern;
      program instructions to generate a digital twin of the pipeline infrastructure based on the received data;
      program instructions to generate defect data based on simulating one or more defect scenarios associated with the digital twin;
      program instructions to analyze the defect data;
      program instructions to create an action plan based on analysis; and
      program instructions to output the action plan.

16. The computer system of claim 15, wherein the pipeline infrastructure further consisting of, a subsea distribution pipeline, a drainage and sewage piping, an industrial pipeline distribution carrying raw materials, a pipeline in a medical environment, a pipeline for heating and a pipeline associated with food consumption.

17. The computer system of claim 15, wherein the received data further consisting of the materials being carried by the pipeline infrastructure and diagram/pipeline CAD (computer aided design) rendering of the entire pipeline infrastructure.

18. The computer system of claim 15, wherein the one or more defect scenarios further consisting of, simulate drainage and sewage piping system of any asset to identify which portion of the pipeline or valve can emit waste effluents and get toxic and health threatening substances which could mix with other pipelines, simulate which portion of piping system will have toxic gases or drainage water that can produce foul smell and predicting foul smell that can turn into sewer gases, analyze an asset and identify which access point are highly vulnerable to weather changes and which points might interact with other points, predicting scaling/rusting in the pipeline infrastructure and analyze and predict which joints/coupling within the pipeline infrastructure could failed due to age of pipeline material used and/or changes to the materials being carried.

19. The computer system of claim 15, wherein the defect data further consisting of, identified damages in water pipes, defect in valves based on the types of material, identified which portion of physical pipes that can have scaling or rusting and identified the possible timeline when the physical pipes could face potential problem and needs replacement.

20. The computer system of claim 15, wherein outputting the action plan further comprises:

sending one or more robotic drones to perform tasks outlined by the action plan.

* * * * *